(12) United States Patent
Li et al.

(10) Patent No.: US 11,442,344 B2
(45) Date of Patent: Sep. 13, 2022

(54) HANDHELD HEAD MOUNT AND CLAMP STRUCTURE

(71) Applicant: GUANGDONG SIRUI OPTICAL CO., LTD., Zhongshan (CN)

(72) Inventors: Jie Li, Zhongshan (CN); Weibo Luo, Zhongshan (CN)

(73) Assignee: GUANGDONG SIRUI OPTICAL CO., LTD., Zhongshan (CN)

( * ) Notice: Subject to any disclaimer, the term of this patent is extended or adjusted under 35 U.S.C. 154(b) by 0 days.

(21) Appl. No.: 16/478,049

(22) PCT Filed: May 7, 2018

(86) PCT No.: PCT/CN2018/085835
§ 371 (c)(1),
(2) Date: Jul. 16, 2019

(87) PCT Pub. No.: WO2019/205185
PCT Pub. Date: Oct. 31, 2019

(65) Prior Publication Data
US 2021/0356847 A1    Nov. 18, 2021

(30) Foreign Application Priority Data
Apr. 28, 2018  (CN) .......................... 201810403891.3

(51) Int. Cl.
*G03B 17/56* (2021.01)
*F16M 11/04* (2006.01)
(Continued)

(52) U.S. Cl.
CPC ......... *G03B 17/563* (2013.01); *F16M 11/041* (2013.01); *F16M 11/06* (2013.01); *F16M 13/04* (2013.01)

(58) Field of Classification Search
CPC .... G03B 17/56; G03B 17/561; G03B 17/563; G03B 17/566; F16M 11/00; F16M 11/02;
(Continued)

(56) References Cited

U.S. PATENT DOCUMENTS 8,176,603 B2    5/2012  Carnevali
2015/0090845 A1  4/2015  Trelford
(Continued)

FOREIGN PATENT DOCUMENTS

CN    205137024 U  *  4/2016
CN    205173931        4/2016
(Continued)

*Primary Examiner* — Clayton E. LaBalle
*Assistant Examiner* — Fang-Chi Chang
(74) *Attorney, Agent, or Firm* — Loeb & Loeb LLP (57) ABSTRACT

A clamping mechanism comprises: a main body; a pair of clamps are arranged on the main body, and each clamp may be moved along the clamping main body thereof the holding direction reciprocates relative to the main body; the clamping width maintaining mechanism is disposed on the main body for maintaining the clamping width of each pair of clamps to be adapted to the photographing device to be clamped; the adjusting mechanism is disposed on the main body for adjusting the spacing between one of each pair of clamps and the main body in the clamping direction for adjusting the clamping center of each pair of clamps while maintaining the clamping width of each pair of clamps relative to the center of the subject.

14 Claims, 7 Drawing Sheets

(51) Int. Cl.
*F16M 11/06* (2006.01)
*F16M 13/04* (2006.01)

(58) Field of Classification Search
CPC .... F16M 11/04; F16M 11/043; F16M 11/045; F16M 11/046; F16M 11/06; F16M 11/10; F16M 11/105; F16M 11/18; F16M 11/20; F16M 11/2007; F16M 11/2021; F16M 11/2028; F16M 13/00; F16M 13/04
See application file for complete search history.

(56) References Cited

U.S. PATENT DOCUMENTS

2015/0359114 A1* 12/2015 Yang ............... F16M 11/04
 248/161
2017/0159875 A1* 6/2017 Wagner ............ G03B 17/563

FOREIGN PATENT DOCUMENTS

| | | | |
|---|---|---|---|
| CN | 205877664 | | 1/2017 |
| CN | 206164640 | | 5/2017 |
| CN | 206449389 | | 8/2017 |
| CN | 206669261 U | * | 11/2017 |
| CN | 208253143 | | 12/2018 |
| DE | 202015001540 U1 | * | 6/2015 ........... F16M 11/242 |

\* cited by examiner

HANDHELD HEAD MOUNT AND CLAMP STRUCTURE

CROSS-REFERENCE TO RELATED APPLICATIONS

This is a national stage application of PCT application serial number PCT/CN2018/085835, filed on May 7, 2018, which claims priority to a Chinese patent application, application number 201810403891.3, filed on Apr. 28, 2018, whose applications are incorporated by reference in their entirety herein.

TECHNICAL FIELD

Aspects of the invention relates to the technical field of photographing device, in particular to a handheld head and a clamping mechanism thereof

BACKGROUND

With the popularity of the live broadcast industry and the popularity of photography activities among the general public, the application of handheld heads is becoming more widespread. The handheld head mount generally includes a handle and a gimbal disposed on the handle. The head mount has a clamping mechanism for holding the photographing device, and the handheld head mount is further divided into a single-axis and a multi-axis, a single-axis handheld head mount or a multi-axis handheld head mount It may drive the head mount to rotate in a single dimension or multiple dimensions to achieve stable head mount. Regardless of the single-axis or multi-axis hand-held stabilizer, the axis of one rotating shaft is parallel to the optical axis of the lens of the holding camera, and the rotating shaft is a rolling axis, which may drive the camera to reciprocate in its plane. Generally, the clamping center of the clamping mechanism is close to or coincides with the axis of the rolling axis, which is convenient for the rolling motor to drive the shooting device to rotate freely, but with the appearance of new shooting equipment or new auxiliary components on the original shooting equipment, All of them make the center of gravity of the shooting device deviate from the preset center of gravity of the handheld head mount. On the one hand, the motor load is increased, the power consumption of the device is increased, and the battery life is shortened; on the other hand, the user's grip discomfort is increased, which is more likely to occur.

Therefore, in the prior art, a handheld head with adjustable center of gravity is provided, and the mobile phone holder includes an upper clamp and a lower clamp connected by a telescopic assembly, and a clamp main body that is slidably disposed on the telescopic assembly, and the handheld head also has an installation. The posture arm of the mobile phone holder and the main body of the clip are simultaneously slidably disposed on the posture arm. Although the prior art enables the clamped photographing device to move up, down, left and right relative to the roll axis to adjust the position of the center of gravity, its up and down adjustment in the direction perpendicular to the posture arm are not reliable, and the telescopic assembly includes the slide rail and may telescopically retracted in the slide rail, the clip main body is slidably disposed on the slide rail, and the adjustment device moves the slide device up and down by linear sliding in the clip main body during the adjustment, but in actual use, once the photographing device is clamped on the mobile phone clip, the upper clip is clamped under the force of the spring, and the mobile phone is still clamped in the middle of the clip. The upper clip and the lower clip are symmetric with respect to the position of the mobile phone, which is no different from the ordinary elastic clamp, and may not be adjusted at all.

SUMMARY

Therefore, the technical problem to be solved by aspects of the invention is to overcome the defect that the clamping mechanism of the handheld head mount in the prior art may not adjust the position of the center of gravity of the photographing device during use, thereby providing a position of the center of gravity of the photographing device being clamped. A gripping mechanism for the handheld head mount that adjusts to make the center of gravity of the photographing device more closely match the preset center of gravity of the head mount.

Further provided is a handheld head mount head having the above-described clamping mechanism. The technical solution adopted by aspects of the invention is as follows:

A clamping mechanism for a handheld head mount head, comprising: a main body; a clamping clamp, a pair of activities are disposed on the main body, and each of the clamping clamps is reciprocable relative to the main body in a clamping direction thereof; Holding a width maintaining mechanism disposed on the main body for maintaining a clamping width of each pair of the clamping clamps to be adapted to a photographing device to be clamped; an adjusting mechanism disposed on the main body for adjusting each pair a spacing between one of the clamps and the main body in the clamping direction for adjusting each pair while maintaining a constant clamping width of each pair of the clamps The relative position of the clamping center of the clamp to the center of the main body.

The grip center is a straight line passing through the center of a pair of clamps in the gripping direction. The clamps on the main body are disposed in pairs, and each of the clamps is reciprocal relative to the main body in a clamping direction thereof, and an adjustment mechanism acts on one of each pair of clamps to move relative to the main body, changing the distance between the clamps and the main body in the clamping direction, when the clamping width of the pair of clamps remains unchanged, the spacing between one clamp and the main body is adjustable, and the other clamp is also driven to change the center of the grip of the pair of clamps. The shooting device is placed in a pair of clamps. At this time, if the center of gravity of the photographing device is offset from the gripping center of the clamps, and the spacing between one of the clamps and the main body is adjusted, the clamping center of the pair of clamps may be changed. Regardless of whether the clamping width of a pair of clamps is always fixed, it may be adjusted to maintain it at a different set width. For example, when the spacing between a pair of clamps is always fixed, ie, the two are kept moving in synchronism, adjusting one of the clamps to approach or away from the main body necessarily drives the other clamp away from or near the main body, such that a pair of clamps The clamping center moves accordingly; when the spacing between the pair of clamps may be adjusted by the movement of the two relative to the main body and the spacing of the respective bodies to the main body, the clamping center may naturally move at will, and the adjustment range may be adjusted. Larger; when the spacing between a pair of clamps may be adjusted by respectively moving the two relative to the main body, respectively adjusting the spacing to the main body, but when the two are elastically tensioned, the photographing device is clamped in one In the clamps, the clamping width of the clamps remains unchanged, and when one of the clamps is adjusted to be close to or away from the main body, the other must also be adjusted as it moves away from or near the main body. With this arrangement, when the center of gravity of the photographing device is deviated from the center of the main body, the center of gravity of the photographing device held on the clamps may be moved by adjusting the center of the grip of the clamps in a direction opposite to the direction of the deviation. Moving toward the center of the main body, alleviating the bias of the shooting device, so that the center of gravity of the shooting device is as close as possible to the center of the main body, thereby adjusting the center of gravity of the handheld gimbal, and is more advantageous for holding the gimbal after holding the shooting device. Self-balancing, and the appropriate center of gravity position may also reduce the corresponding motor loss, making the motor easier to move the gimbal.

The adjustment mechanism includes an driving structure that drives the clamps to move relative to the main body. The user adjusts the relative position of the clamp and the main body through the driving structure, and the adjustment is more convenient. The driving structure may be an electric driving structure or a manual driving structure.

The drive structure is disposed on an outer side of the clamp. The drive structure is set at this position, the design is reasonable, easy to adjust, and the operation drive structure is not interfered by the movement of the clamps.

The driving structure is a thread adjustment structure. The thread matching movement converts the threaded movement into a close motion between the clamp and the main body, and the structure is simple, the operation is convenient, and the damage is not easy. The thread adjusting structure may be a matching structure of a screw and a nut, or may be a mating structure of a screw nut. The screw is disposed on the main body, and the clamping clamp has an internal thread structure, and the clamping clamp is threadedly engaged with the lead screw through the internal thread structure thereof. The activity is set on the lead screw, and the clamp is rotated to reciprocate itself along the lead screw.

The thread adjustment structure includes an internal thread structure disposed on the main body, and a screw connected to the clamp to be adjusted, the screw is threadedly engaged with the internal thread structure to drive the clamp toward or reciprocating away from the direction of the main body.

The driving structure is an adjusting knob fixedly disposed at an end of the screw, and the adjusting knob is rotated to drive the screw to be threadedly engaged with the internal thread structure. Rotate the adjustment knob to tighten the screw so that the clamps are close to the main body. Turn the adjustment knob to loosen the screw to keep the clamps away from the main body.

The screw is disposed through the clamp, and the adjustment knob is disposed outside the clamp. The screw may also not penetrate the clamps, and the end of the screw is fixedly connected with an adjustment knob, the end of the adjustment knob abuts against the inner side of the clamp, the rotation adjustment knob pushes the clamp away from the main body, or releases the clamp close to the main body.

The clamping width holding mechanism is an elastic clamping mechanism. The clamping width may be automatically adjusted by the elastic clamping force for more convenient and comfortable use.

The elastic clamping mechanism includes a receiving cavity disposed on the main body, a slider slidably engaged with the receiving cavity, and a resilient biasing member disposed between the slider and the receiving cavity, The elastic biasing force of the resilient biasing member acts on the slider to cause the slider to have a tendency to retract into the receiving cavity, and the clamping clamp is coupled to an end of the slider that protrudes from the receiving cavity.

The clamping width retaining mechanism may also be a connecting rod fixedly connected between the pair of clamps, the length of the connecting rod is fixed, and when the clamping width of the pair of clamps is maintained at the set width, the adjusting mechanism adjusts one of them. The clamps may drive the other clamp to move, thereby adjusting the center of the clamp; or the connecting rod is a telescopic rod, and the locking structure may lock the clamping position of the pair of clamps at different clamping widths.

The clamping width retaining mechanism may also be an adjusting mechanism acting on the other clamp of the pair of clamps, and the two adjusting mechanisms respectively act on the two clamps, so that the spacing between the two clamps to the main body may be independent. The adjustment of the separate, then the clamping center may naturally move freely, the adjustment range is larger.

The clamping clamp includes a fixing portion and a movable portion movably coupled to the fixing portion, the fixing portion is disposed on the main body, and the movable portion has a storage state close to the main body and a clip away from the main body, a clamped state. It is convenient to reduce the volume of the clamping mechanism and is convenient to carry. It should be noted that the storage may be a folding storage or a telescopic storage.

The movable portion is hinged to the fixed portion, and the movable portion is rotatable toward or away from the holding center to switch between the stored state and the clamped state.

A hand-held head mount head includes a handle and the above-mentioned clamping mechanism disposed on the handle, and a main body of the clamping mechanism is disposed on the handle. By adjusting the position of the center of gravity of the clamping mechanism, the center of gravity of the clamping and the center of gravity of the handheld head are more adapted, which is convenient for the user to lift, and is more convenient and labor-saving to use.

The handle is provided with a rotating portion that is rotatable relative to the handle, and a main body of the clamping mechanism is fixedly disposed on the rotating portion. By adjusting the center of gravity of the clamping mechanism to adapt to the center of rotation of the rotating portion, the position of the center of gravity of the handheld head mount is prevented from being shifted, so that the load of the driving mechanism that drives the rotating portion is increased, resulting in an increase in the load. The power consumption is increased, the battery life is shortened, and even the overload protection causes the gimbal to be unusable.

Also included is a drive mechanism that drives the rotation of the rotating portion, the drive mechanism being a brushed motor. The brushed motor is simpler in structure and cheaper than the brushless motor, and the technology and process are more mature and reliable. The brushed motor may be a DC brushed motor.

BRIEF DESCRIPTION OF THE DRAWINGS

In order to more clearly illustrate the specific embodiments of aspects of the invention or the technical solutions in the prior art, the drawings used in the specific embodiments or the description of the prior art will be briefly described below, and obviously, the attached in the following description The drawings are some embodiments of aspects of the invention, and those skilled in the art may obtain other drawings based on these drawings without any creative work.

DETAILED DESCRIPTION

The technical solutions of aspects of the invention will be clearly and completely described in the following with reference to the accompanying drawings. It is obvious that the described embodiments are a part of the embodiments of aspects of the invention, and not all of the embodiments. All other embodiments obtained by a person of ordinary skill in the art based on the embodiments of aspects of the invention without departing from the inventive scope are the scope of aspects of the invention.

In the description of aspects of the invention, it should be noted that the orientations or positional relationships of the terms "center", "upper", "lower", "vertical", "horizontal", "inside", "outside", etc. are based on The orientation or positional relationship shown in the drawings is merely for the convenience of the description of aspects of the invention and the description of aspects of the invention, and is not intended to indicate or imply that the device or component referred to has a specific orientation, is constructed and operated in a specific orientation, and therefore may not be understood as Limitations of aspects of the invention.

In the description of aspects of the invention, it should be noted that the terms "installation", "connected", and "connected" are to be understood broadly, and may be fixed or detachable, for example, unless otherwise explicitly defined and defined. Connection, or integral connection; may be mechanical connection or electrical connection; may be directly connected, or may be indirectly connected through an intermediate medium, and may be internal communication between the two elements. For those skilled in the art, the above terms may be understood in the specific case.

The specific meaning of aspects of the invention.

Further, the technical features involved in the different embodiments of aspects of the invention described below may be combined with each other as long as they do not constitute a conflict therebetween.

DESCRIPTION OF THE REFERENCE NUMBERS

1—clamping mechanism; 11—main body; 111—accommodating cavity; 112—slider; 113—resilient biasing member; 12—clamp; 121—fixing portion; 122—movable portion; 13—screw; 14—adjustment nob; 2—handle; 21—rotating portion; 22—brushed motor; 3—photographing device.

Embodiment 1

As shown in FIG. 1-8, the clamping mechanism 1 for a handheld head mount provided in this embodiment includes: a main body 11; a pair of clamping clamps 12 movably disposed on the main body 11, and the clamps 12 are reciprocally movable relative to the main body 11 in a clamping direction thereof. A clamping width retaining mechanism is disposed on the main body 11 for maintaining a clamping width of each pair of the clamps 12 The clamping photographing device 3 is adapted; an adjusting mechanism is disposed on the main body 11 for adjusting one of the pair of the clamps 12 and the main body 11 in the clamping direction The spacing between them is to adjust the relative position of the center of the grip of each pair of the clamps 12 to the center of the main body 11 while maintaining the nip width of each pair of the clamps 12 constant.

The gripping center is a straight line passing through the center line of the pair of clamps 12 in the clamping direction. The clamps 12 on the main body 11 are disposed in pairs, and each clamp 12 is reciprocally movable relative to the main body 11 in its clamping direction, and an adjustment mechanism acts on one of each pair of clamps 12 to make it relatively Moving between the main body 11 and changing the distance between the clamps 12 and the main body 11 in the clamping direction, in the case where the clamping width of the pair of clamps 12 remains unchanged, such that between the clamps 12 and the main body 11 The spacing is adjustable, and the other clamp 12 is moved along with it, so that the clamping center of the pair of clamps 12 may be changed. The photographing device 3 is placed in a pair of clamps 12, and at this time, if the center of gravity of the photographing device 3 is offset from the grip center of the clamps 12, the distance between one of the clamps 12 and the main body 11 is adjusted, and the pair of clips may be changed. The clamping center of the clamp 12, regardless of whether the clamping width of the pair of clamps 12 is always fixed, may be adjusted to maintain a different set width.

For example, when the spacing between the pair of clamps 12 is always fixed, that is, the two are kept in synchronous movement, adjusting one of the clamps 12 to approach or away from the main body 11 necessarily drives the other clamp 12 away from or near the main body 11, The center of the clamping of the pair of clamps 12 is moved accordingly; when the spacing between the pair of clamps 12 may be adjusted by the movement of the two relative to the main body 11, respectively, and the spacing of the respective bodies 11 is adjusted, then the clamping is performed. The center may also be moved freely, and the adjustment range is larger; when the distance between the pair of clamps 12 may be adjusted by the movement of the two relative to the main body 11, respectively, adjusting the spacing of the respective bodies 11 to the main body 11, but between the two When elastically tensioned, the photographing device 3 is clamped in the pair of clamps 12, and the grip width of the clamps 12 remains unchanged. When one of the clamps 12 is adjusted to be close to or away from the main body 11, the other must be away from each other. Or close to the main body 11, the center of the grip is also adjusted. With this arrangement, when the center of gravity of the photographing device 3 is deviated from the center of the main body 11, the gripping center of the gripping clamp 12 may be moved relative to the main body 11 in a direction opposite to the direction of the deviation so that the photographing is performed on the gripper 12 The center of gravity of the device 3 is correspondingly moved toward the center of the main body 11, which relieves the bias of the photographing device 3, so that the center of gravity of the photographing device 3 is as close as possible to the center of the main body 11, thereby adjusting the center of gravity of the handheld gimbal, and more Conducive to clamping the camera 3 after the handheld's own balance, while the appropriate center of gravity position may also reduce the corresponding motor loss, making the motor easier to move the gimbal.

In this embodiment, the spacing between the pair of clamps 12 may be adjusted by adjusting the respective distances from the main body 11 to the main body 11, respectively, but the two may be elastically tensioned, specifically the clamping width holding mechanism is an elastic clamping mechanism 1. The elastic clamping mechanism 1 includes a receiving cavity 111 disposed on the main body 11, a slider 112 slidably engaged with the receiving cavity 111, and a slider 112 and the receiving cavity 111. The resilient biasing member 113, the elastic biasing force of the resilient biasing member 113 acts on the slider 112, so that the slider 112 has a tendency to retract into the receiving cavity 111, and the clamping clamp 12 is connected to the slider 112 to extend out of the receiving cavity 111. One end.

Each of the clamps 12 is connected with two sliding rods 112 arranged in parallel. Correspondingly, the main body 11 has two receiving chambers 111 adapted to slide the sliding rod 112, and the resilient biasing members 113 are sleeved on each of the sliding rods 112. On the upper elastic compression spring, the opening of the accommodating cavity 111 is provided with a radial boss having a smaller diameter, and the slider 112 is provided with a radial boss having a larger diameter, and the elastic compression spring is located between the two radial bosses. The axial ends thereof are respectively abutted on the two radial bosses. When the elastic compression spring is in the natural state, the clamps 12 are at the initial position, and when the elastic compression spring is in the stretched state, the clamps 12 are located at the clamping position. In position, the restoring force of the elastic compression spring acts on the clamps 12 to have a tendency to return to the initial position, achieving elastic clamping of the photographing device 3.

The adjustment mechanism includes an driving structure that drives the relative movement of the clamps 12 with the main body 11. The user adjusts the relative position of the clamping clamp 12 and the main body 11 by adjusting a driving structure, and the adjustment is more convenient; and the driving structure is disposed on the outer side of the clamping clamp 12. The position of the driving structure is convenient to adjust. The operation drive structure is not interfered by the movement of the clamps 12. In this embodiment, the driving structure is a manual driving structure.

Specifically, the driving structure is a thread adjustment structure. The thread adjustment structure includes an internal thread structure disposed on the main body 11, and a screw 13 coupled to the clamp 12 to be adjusted The screw 13 is threadedly engaged with the internal thread structure to drive the clamp 12 to reciprocate toward or away from the main body 11. The structure is simple, the operation is convenient, and the damage is not easy. The driving structure is an adjustment knob 14 fixedly disposed at an end of the screw 13, and the adjustment knob 14 is rotated to drive the screw 13 to be threadedly engaged with the internal thread structure. Rotate the adjusting knob 14 to tighten the screw 13, so that the clamping clamp 12 is close to the main body 11, and the adjusting knob 14 is rotated to loosen the screw 13, so that the clamping clamp 12 is away from the main body 11, and the screw 13 is disposed through the clamping clamp 12, and the adjusting knob 14 is set. On the outside of the clamps 12. The screw 13 may also not penetrate the clamp 12, and the end of the screw 13 is fixedly connected to the adjustment knob 14, the end of the adjustment knob 14 abuts against the inner side of the clamp 12, and the rotation adjustment knob 14 pushes the clamp 12 away from the main body 11, or releases the clamp The clamp 12 is close to the main body 11.

The gripper 12 includes a fixed portion 121 and a movable portion 122 movably coupled to the fixed portion 121. The fixed portion 121 is disposed on the main body 11, and the movable portion 122 has a accommodating state close to the main body 11 and a nip state away from the main body 11. The movable portion 122 is hinged to the fixed portion 121, and the movable portion 122 is rotatable toward or away from the center of the grip to switch between the stored state and the gripped state. Easy to reduce the clamping mechanism 1 volume, easy to carry.

The embodiment further provides a handheld head mount head, specifically a single-axis handheld head mount head, comprising a handle 2, a rotating portion 21 disposed on the handle 2, and the above-mentioned clamping mechanism 1 disposed on the rotating portion 21, through the adjusting clip The center of gravity of the holding mechanism 1 is adapted to the center of rotation of the rotating portion 21, which reduces the load on the driving mechanism that drives the rotating portion 21 to be increased due to the deviation of the center of gravity of the photographing device 3 from the predetermined center of gravity of the handheld head. The power consumption of the equipment is increased, the battery life is shortened, and even the overload protection causes the gimbal to be unusable.

Also included is a drive mechanism that drives the rotation of the rotating portion 21, which is a brushed motor 22. The brushed motor 22 is simpler in structure and cheaper than the brushless motor, and the technology and process are more mature and reliable. The brushed motor 22 may be a DC brushed motor 22.

Figure 1:
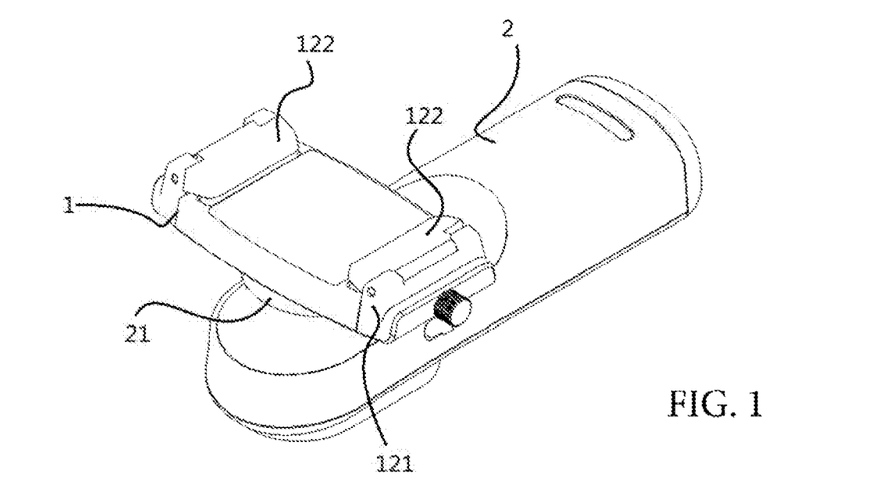
FIG. 1 is a three-dimensional structural diagram of a movable portion of a gripping head of a handheld head mount provided in a storage state according to a first embodiment of aspects of the invention.
Figure 2:
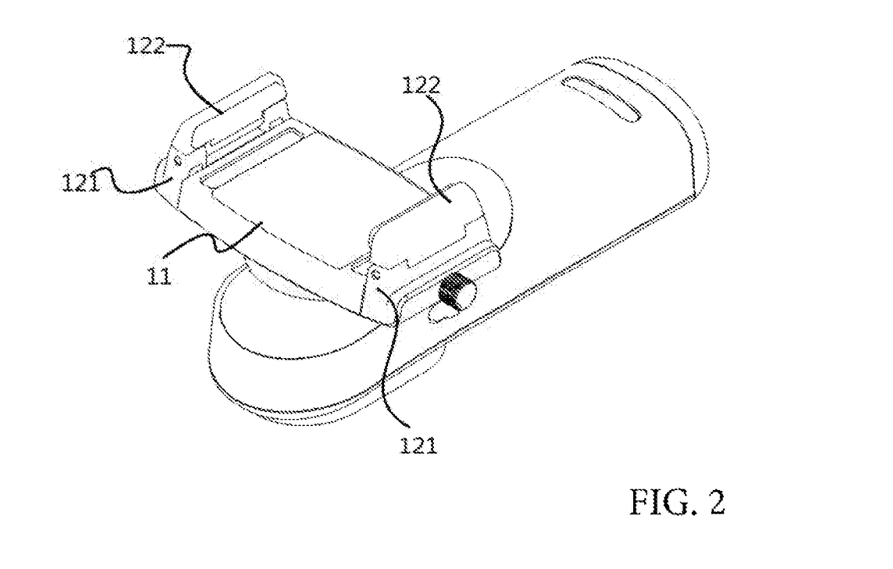
FIG. 2 is a schematic perspective view showing the movable portion of the gripper of the handheld head mount shown in FIG. 1 in a clamped state.
Figure 3:
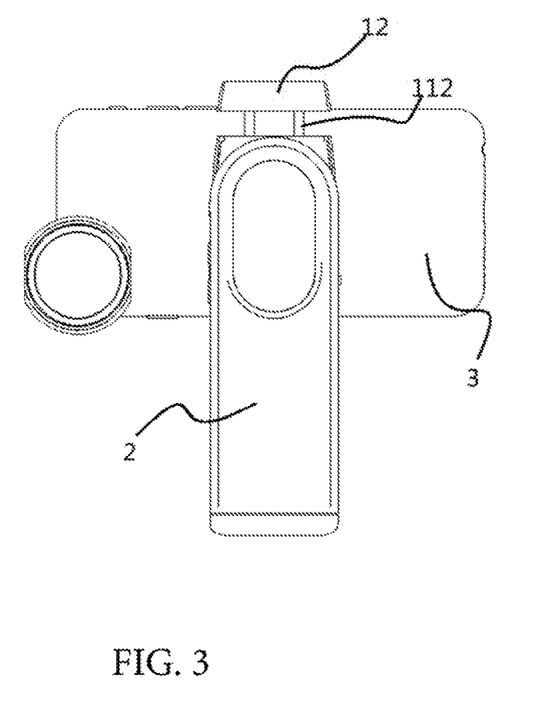
FIG. 3 is a rear view of the handheld head mount holding camera of FIG. 1.
Figure 4:
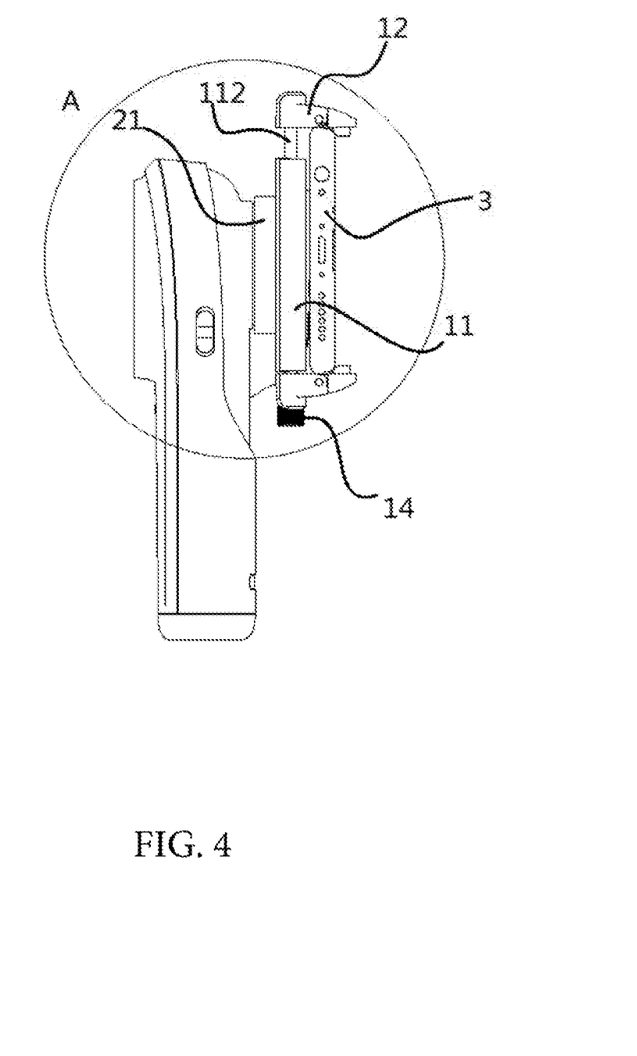
FIG. 4 is a right side view of the handheld head mount holding and photographing device shown in FIG. 3.
Figure 5:
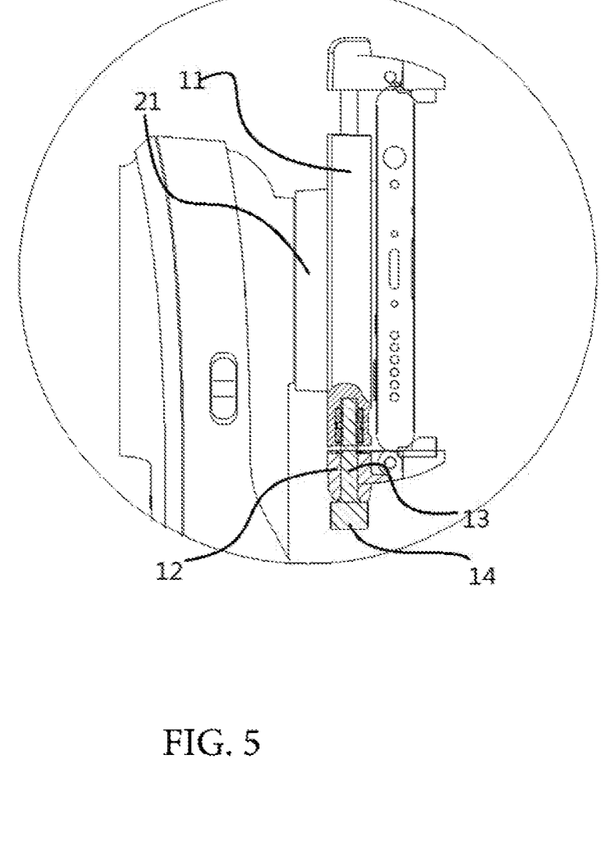
FIG. 5 is an enlarged view of the portion A shown in FIG. 4.
Figure 6:
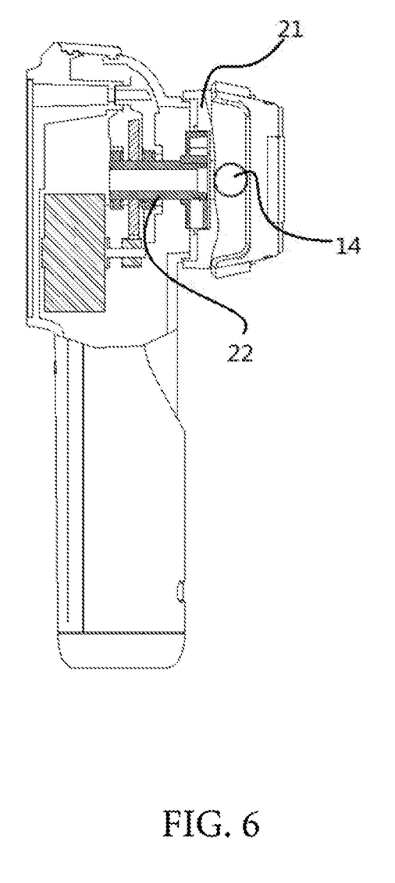
FIG. 6 is a partial cross-sectional view of the handheld head mount holding the photographing device shown in FIG. 4.
Figure 7:
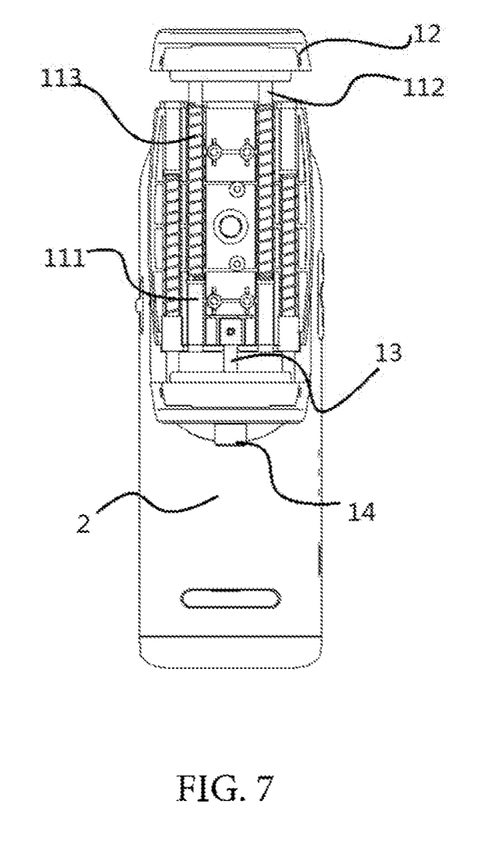
FIG. 7 is another partial cross-sectional view of the handheld head mount holding and photographing device shown in FIG. 1.
Figure 8:
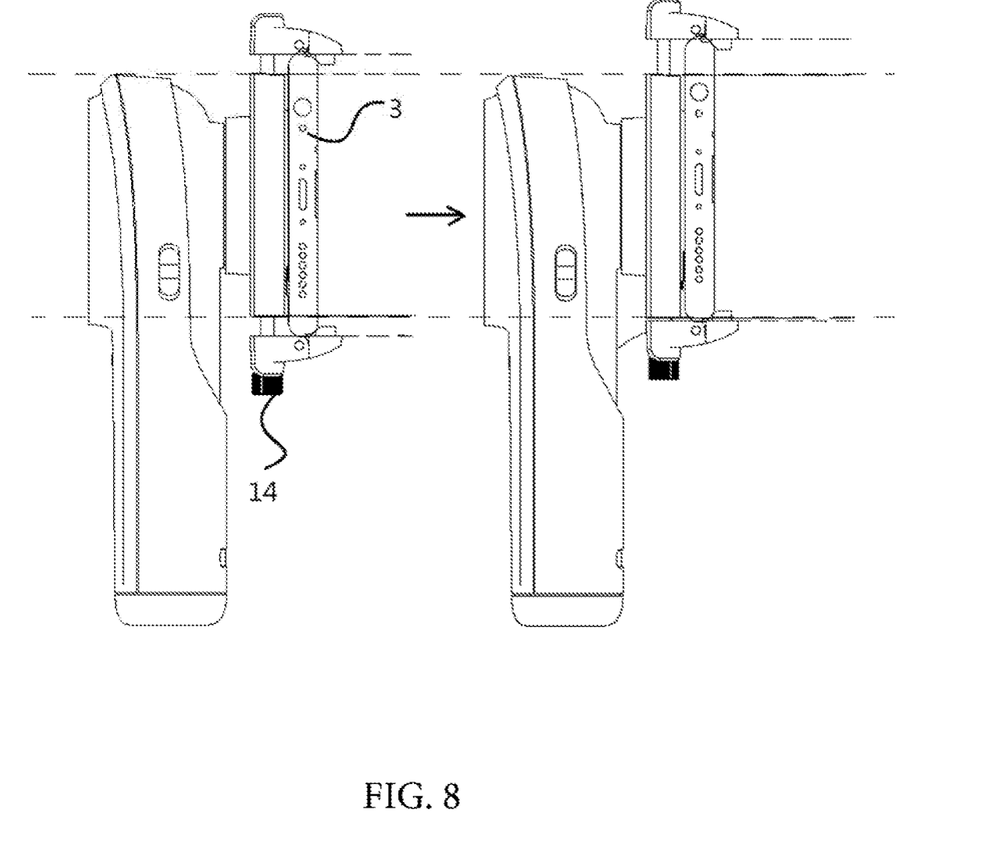
FIG. 8 is a schematic view showing the process of adjusting the clamping center when the handheld head mount shown in FIG. 1 holds the photographing device.

The working process of the handheld gimbal is as follows: As shown in FIGS. 3-4, the shooting device 3 is a mobile phone with an auxiliary part added to the lens. The center of gravity of the shooting device 3 is moved downward relative to the center of gravity of the mobile phone itself, and the clamp 12 is opened. The device 3 is clamped between a pair of clamps 12, and under the action of the elastic clamping mechanism 1, the clamps 12 elastically clamp the photographing device 3, without being affected by the adjustment mechanism, at this time, the pair of clamps 12 Symmetrically distributed on both sides of the main body 11, causing the center of gravity of the photographing device 3 to be located below the center of the main body 11, and the center of the main body 11 coincides with the driving axis of the rotational center driving mechanism of the rotating portion 21, so that the center of gravity of the photographing device 3 is located The center of rotation of the rotating portion 21 and the driving shaft below the driving mechanism cause a center of gravity deviation. At this time, as shown in FIG. 8, from left to right, the adjustment knob 14 is rotated, and the screw 13 is tightened, and the distance between the clamp 12 directly pushed by the screw 13 and the main body 11 is gradually decreased.

Since the grip width is always matched with the photographing device 3, the other clamp 12 is moved to gradually increase the distance from the main body 11, so that the pair of clamps 12 as a whole move upward relative to the handle 2, the grip center With the upward movement, the main body 11 and the handle 2 are relatively fixed, that is, the center of the clamping of the pair of clamps 12 is moved upward relative to the center of the main body 11, causing the center of gravity of the photographing device 3 to move up, closer to the center of the main body 11 and The driving axis of the rotation center driving mechanism of the rotating portion 21 makes the center of gravity of the photographing device 3 more closely match the preset center of gravity area of the handheld head mount; otherwise, if the center of gravity of the photographing device 3 is higher than the center of the main body 11, the reverse adjustment is performed. The screw 13 may move the center of gravity of the photographing device 3 downward.

As an alternative embodiment of the first embodiment, the driving structure may be an electric driving structure, and the motor is driven by the button to drive the screw to rotate in the forward and reverse directions.

As an alternative embodiment of the first embodiment, the thread adjusting structure may be a mating structure of a screw and a nut, or may be a mating structure of a threaded nut. The lead screw is disposed on the main body, and the clamping clamp has an internal thread structure, and the clamping clamp passes The internal thread structure cooperates with the screw thread, and is disposed on the lead screw, and rotates the clamp to reciprocate itself along the screw.

As an alternative embodiment of the first embodiment, the movable portion of the clamping clamp may also be a telescopic storage, and the fixing portion has an insertion cavity adapted for the insertion of the movable portion. When the clamping is required, the movable portion may be fixed at the position of the protruding insertion cavity. At the time of storage, the movable portion may be retracted into the insertion cavity for easy storage. As an alternative embodiment of the first embodiment, the clamping width maintaining mechanism may further be a connecting rod fixedly connected between the pair of clamps, the length of the connecting rod is fixed, the connecting rod is disposed through the main body, or is disposed on the surface of the main body. When the clamping width of the pair of clamps is maintained at the set width, the adjusting mechanism adjusts one of the clamps to move the other clamp to adjust the clamping center; or the connecting rod is a telescopic rod, and the locking is matched The structure is capable of locking the clamping position of a pair of clamps at different clamping widths.

As an alternative embodiment of the first embodiment, the clamping width retaining mechanism may also be an adjusting mechanism acting on the other of the pair of clamps, and the two adjusting mechanisms respectively act on the two clamps to make two The spacing between the clamps and the main body may be independently adjusted separately, so the clamping center may naturally move at will, and the adjustment range is larger.

As an alternative embodiment of the first embodiment, the handheld head mount is a three-axis handheld head mount. It is apparent that the above-described embodiments are merely illustrative of the examples, and are not intended to limit the embodiments. Other variations or modifications of the various forms may be made by those skilled in the art in light of the above description. There is no need and no way to exhaust all of the implementations. Obvious changes or variations resulting therefrom are still within the protection of aspects of the invention.

What is claimed is:

1. A clamping mechanism for a handheld head comprising:
    a main body (11); a pair of clamps (12) disposed on the main body (11), and each of the clamps (12) moving reciprocally relative to the main body (11) in a clamping direction;
    a clamping width holding mechanism is disposed on the main body (11) for maintaining a clamping width of the pair of clamps (12) to be compatible with a photographing device (3) to be clamped; and
    an adjustment mechanism disposed on the main body (11) for adjusting the pair of clamps (12) in the clamping direction, wherein the adjustment mechanism drives the pair of clamps (12) relative to the main body (11) and changes a distance between the pair of clamps (12) in the clamping direction and drives the pair of clamps (12) to change a center of the pair of clamps (12) while maintaining the clamping width, wherein the adjustment mechanism adjusts a center of gravity of the photographing device to match a center of gravity of said main body (11) while maintaining a relative position of the pair of clamps (12).

2. The clamping mechanism according to claim 1, wherein the adjustment mechanism comprises a driving structure for driving the relative movement of the clamps (12) with the main body (11).

3. The clamping mechanism according to claim 2, wherein the driving structure is disposed outside of the clamps (12).

4. The clamping mechanism according to claim 2, wherein the driving structure comprises a thread adjustment structure.

5. The clamping mechanism according to claim 4, wherein the thread adjustment structure comprises an internal threaded structure disposed on the main body (11), and is coupled to the clamps (12) to be adjusted; a screw (13), wherein the screw (13) is threadedly engaged with the internal thread structure to drive the clamps (12) to reciprocate toward or away from the main body (11).

6. The clamping mechanism according to claim 5, wherein the driving structure comprises an adjusting knob (14) fixedly disposed at an end of the screw (13), and the adjusting knob (14) rotates the screw (13) to threadedly engage with the internal thread structure.

7. The clamping mechanism according to claim 6, wherein the screw (13) is disposed through the clamps (12), and the adjusting knob (14) is disposed outside the clamps (12).

8. The clamping mechanism according to claim 1, wherein the clamping width holding mechanism comprises an elastic clamping mechanism (1).

9. The clamping mechanism according to claim 8, wherein the elastic clamping mechanism (1) comprises a receiving cavity (111) provided on the main body (11), and the receiving cavity (111), a slider (112), and a resilient biasing member (113) disposed between the slider (112) and the receiving cavity (111), the elasticity of the resilient biasing member (113) a biasing force acts on the slider (112) to cause the slider (112) to have a tendency to retract into the receiving cavity (111), and the clamps (12) are coupled to the slider (112) to exit from one end of the receiving cavity (111).

10. The clamping mechanism according to claim 1, wherein the clamps (12) comprises a fixing portion (121) and a movable portion (122) movably connected to the fixing portion (121), the fixing portion (121) is disposed on the main body (11), and the movable portion (122) has a stored state close to the main body (11) and a clamping away from the main body (11) as a clamped state.

11. The clamping mechanism according to claim 10, wherein the movable portion (122) is hinged to the fixing portion (121), and the movable portion (122) is capable of facing or facing away from a center of the clamps rotating about to switch between the stored state and the clamped state.

12. A handheld head mount head comprising:
a handle (2), and
a clamping mechanism (1) disposed on the handle (2),
wherein the clamping mechanism (1) comprising:
a main body (11); a pair of clamps (12) disposed on the main body (11), and each of the clamps (12) moving reciprocally relative to the main body (11) in a clamping direction;
a clamping width holding mechanism is disposed on the main body (11) for maintaining a clamping width of the pair of clamps (12) to be compatible with a photographing device (3) to be clamped; and
an adjustment mechanism disposed on the main body (11) for adjusting the pair of clamps (12) in the clamping direction, wherein the adjustment mechanism drives the pair of clamps (12) relative to the main body (11) and changes a distance between the pair of clamps (12) in the clamping direction and drives the pair of clamps (12) to change a center of the pair of clamps (12) while maintaining the clamping width, wherein the adjustment mechanism adjusts a center of gravity of the photographing device to match a center of gravity of said main body (11) while maintaining a relative position of the pair of clamps (12).

13. The handheld head mount head according to claim 12, wherein the handle (2) is provided with a rotating portion (21) rotatable relative to the handle (2), the main body (11) being disposed at the rotating portion (21).

14. The handheld head mount head according to claim 13, further comprising a drive mechanism for driving rotation of said rotating portion (21), said drive mechanism being a brushed motor (22).

* * * * *